(12) United States Patent
VanDeWeert et al.

(10) Patent No.: US 10,101,233 B2
(45) Date of Patent: Oct. 16, 2018

(54) SYSTEMS AND METHODS FOR SWITCHED MULTI-TRANSDUCER PRESSURE SENSORS AND COMPENSATION THEREOF

(71) Applicant: KULITE SEMICONDUCTOR PRODUCTS, INC., Leonia, NJ (US)

(72) Inventors: Joseph VanDeWeert, Maywood, NJ (US); Haig Norian, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 323 days.

(21) Appl. No.: 15/162,680

(22) Filed: May 24, 2016

(65) Prior Publication Data

US 2017/0343443 A1 Nov. 30, 2017

(51) Int. Cl.
*G01L 19/04* (2006.01)
*G01L 9/00* (2006.01)
*G01L 19/00* (2006.01)

(52) U.S. Cl.
CPC ............ *G01L 19/04* (2013.01); *G01L 9/0052* (2013.01); *G01L 19/0015* (2013.01)

(58) Field of Classification Search
None
See application file for complete search history.

(56) References Cited

U.S. PATENT DOCUMENTS

| 8,446,220 B2 | 5/2013 | Rozgo et al. |
| 8,490,496 B2 | 7/2013 | Bentley |
| 9,052,217 B2 | 6/2015 | Milley et al. |
| 2007/0227594 A1* | 10/2007 | Chaffee ............... A47C 27/082 137/224 |
| 2010/0305465 A1 | 12/2010 | Ricks et al. |
| 2014/0130605 A1 | 5/2014 | Milley et al. |

* cited by examiner

*Primary Examiner* — Andre Allen
(74) *Attorney, Agent, or Firm* — Troutman Sanders LLP; James E. Schutz; Mark Lehi Jones

(57) ABSTRACT

Systems and methods are disclosed for a switched, multiple range sensor system including multiple transducers. In one embodiment, a method is provided that includes receiving and measuring at a first transducer and a second transducer, a pressure to generate a respective first and second pressure signal; amplifying the first and second pressure signals with corresponding first and second fixed-gain amplifier to generate first and second amplified pressure signals; selecting for monitoring, the first or second amplified pressure signal; converting the selected amplified pressure signal to an intermediate digital pressure signal; measuring, at a thermal sensor associated with the selected amplified pressure signal, a temperature; compensating, based on the measured temperature, the intermediate digital pressure signal to generate a compensated digital pressure output signal; and outputting the compensated digital pressure output signal.

20 Claims, 8 Drawing Sheets

SYSTEMS AND METHODS FOR SWITCHED MULTI-TRANSDUCER PRESSURE SENSORS AND COMPENSATION THEREOF

FIELD

The disclosed technology relates to pressure transducers and more particularly to a sensor having multiple pressure transducers that can be individually switched and selected according to the pressure range being monitored. The disclosed technology further relates to a simplified scheme for compensating the transducers.

BACKGROUND

It is often necessary to measure pressure across a relatively large pressure range with a high degree of accuracy, where the accuracy is typically specified as a percent of full scale. A pressure transducer can be manufactured to have a high accuracy tolerance at full scale, but it can be relatively inaccurate when the measured pressure range is a small fraction of the full scale. To partly address this issue, sensors can be made with multiple transducers, each of which is optimized for a specific portion of the pressure range. For example, it may be necessary to measure a 10 PSI pressure to within 0.05 PSI at one time and then later measure a 500 PSI pressure to within 0.25 PSI at the same location. Certain conventional sensor systems may require two different sensors and associated circuitry to make these measurements. However, such a measurement could be made with a multi-transducer sensor package, provided that the 10 PSI sensor that could withstand the 500 PSI pressure. Within the past several years it has become possible to use a single, high-pressure sensor to more accurately measure a lower pressure using a variety of signal processing techniques. The use of programmable gain amplifiers, digital thermal correction, and high accuracy analog to digital converters has enabled accuracies approaching 0.05% over a number of different pressure ranges. For example, the same 500 PSI sensor could be used to measure ranges such as 0-10 PSI, 0-50 PSI, 0-100 PSI, and 0-500 PSI.

These techniques work well and can be used for many applications; however, sensor noise can limit the use of the lower range of the sensor. Sensor noise level is influenced by many things, but in most instances the dominant source is thermal noise. For a typical piezoresistive sensor, thermal noise at a 10 kHz bandwidth is 0.005%. This can be lowered by reducing the bandwidth; however, in order to be a useful sensor, some bandwidth is needed and not all noise sources are bandwidth dependent. The lower floor of noise level is approximately 0.001% which means that a sensor can usefully be re-ranged to no more than about one tenth its full-scale range. A need still exists for sensor systems and methods that can measure a wide pressure range with high accuracy.

BRIEF SUMMARY

Some or all of the above needs may be addressed by certain implementations of the disclosed technology. Certain implementations of the disclosed technology may include systems and methods for a switched, multiple range sensor system including multiple transducers having a simplified compensation scheme.

In one example implementation, a method is provided that includes receiving and measuring at a first transducer and a second transducer, a pressure to generate a respective first and second pressure signal; amplifying the first and second pressure signals with corresponding first and second fixed-gain amplifiers to generate first and second amplified pressure signals; selecting for monitoring, the first or second amplified pressure signal; converting the selected amplified pressure signal to an intermediate digital pressure signal; measuring, at a thermal sensor associated with the selected amplified pressure signal, a temperature; compensating, based on the measured temperature, the intermediate digital pressure signal to generate a compensated digital pressure output signal; and outputting the compensated digital pressure output signal.

In another example implementation, a system is disclosed. The system can include a first pressure transducer associated with a first pressure range and configured to receive and measure a pressure to generate a first pressure signal; a second pressure transducer associated with a second pressure range and configured to receive and measure the pressure to generate a second pressure signal; a first fixed-gain amplifier configured to amplify the first pressure signal to generate a first amplified pressure signal; a second fixed-gain amplifier configured to amplify the second pressure signal to generate a second amplified pressure signal; a multiplexer in communication with the first and second fixed-gain amplifiers, wherein the multiplexer is configured to receive a selection signal to select, for monitoring, the first or second amplified pressure signal; an analog-to-digital converter configured to convert the selected amplified pressure signal to an intermediate digital pressure signal; at least one thermal sensor configured to measure and output a temperature signal associated with one or more of the first pressure transducer and the second pressure transducer; and a microprocessor configured to: receive the intermediate digital pressure signal; receive the temperture signal; compensate, based on the received temperature signal, the intermediate digital pressure signal to generate a compensated digital pressure output signal; and output the compensated digital pressure output signal.

Other implementations, features, and aspects of the disclosed technology are described in detail herein and are considered a part of the claimed disclosed technology. Other implementations, features, and aspects can be understood with reference to the following detailed description, accompanying drawings, and claims.

and a relatively higher-pressure-range second transducer (lower curves), according to an example implementation of the disclosed technology.

Figure 6:
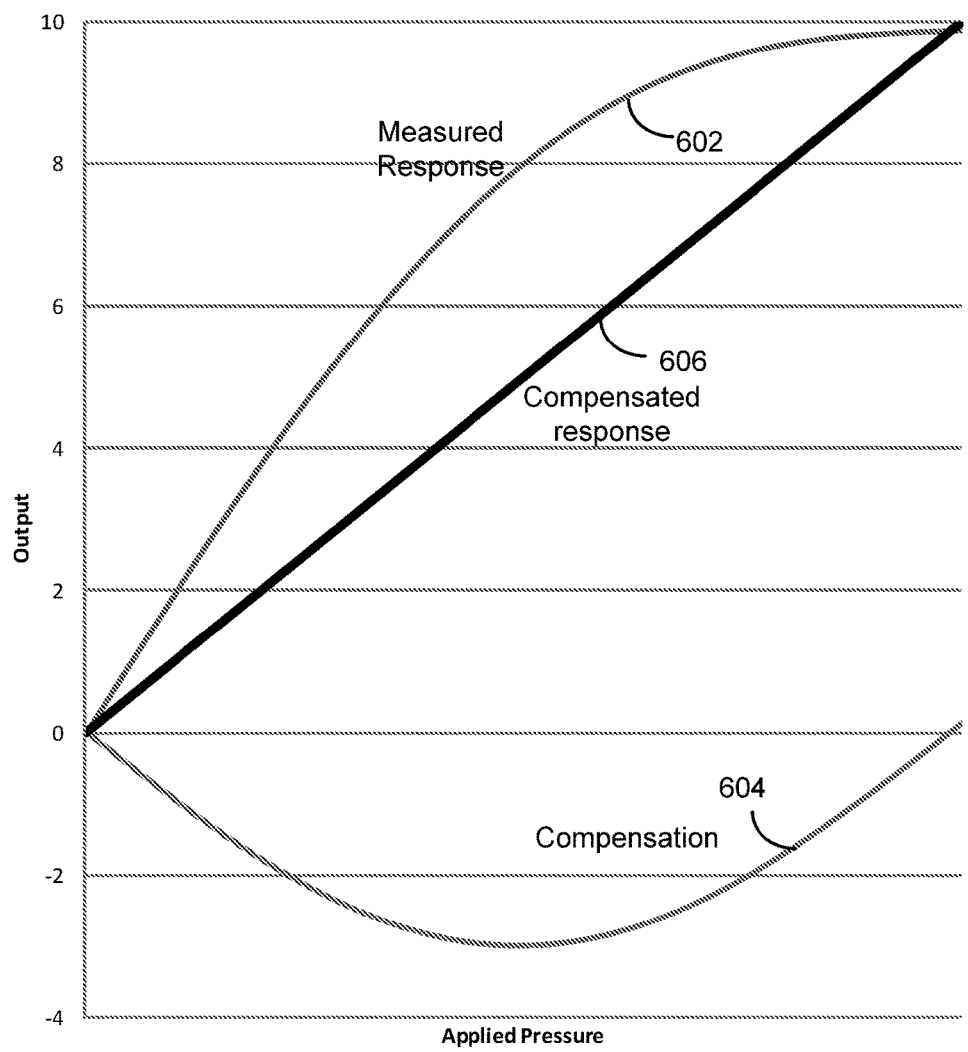

FIG. 6 illustrates an example for compensating the output of a selected transducer to reduce or eliminate a non-linear response as a function of the applied pressure, according to an example implementation of the disclosed technology.

Figure 7:
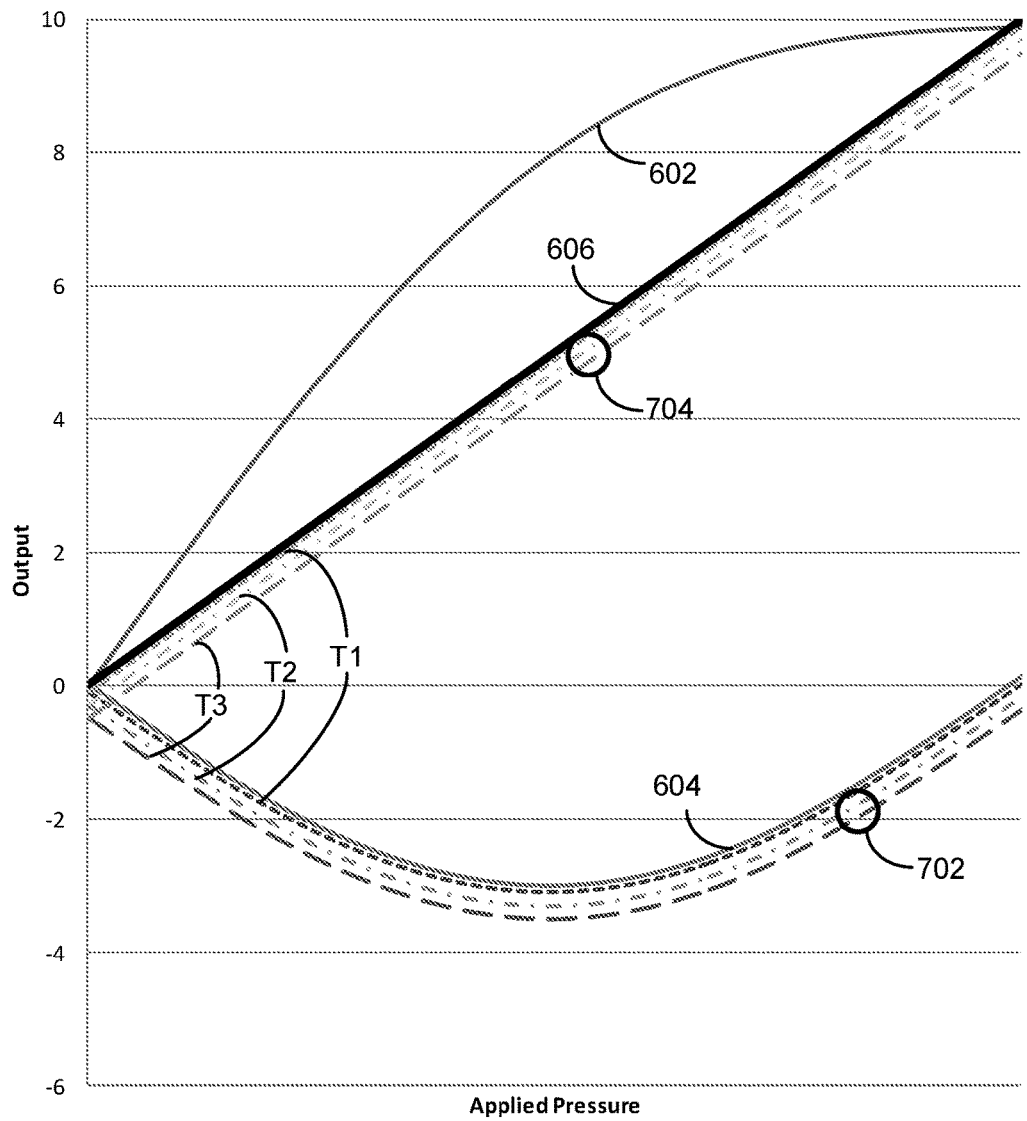

FIG. 7 illustrates an example for compensating the output of a selected transducer for both temperature and non-linearity, according to an example implementation of the disclosed technology. In certain example implementations, the temperature alone may be compensated.

Figure 8:
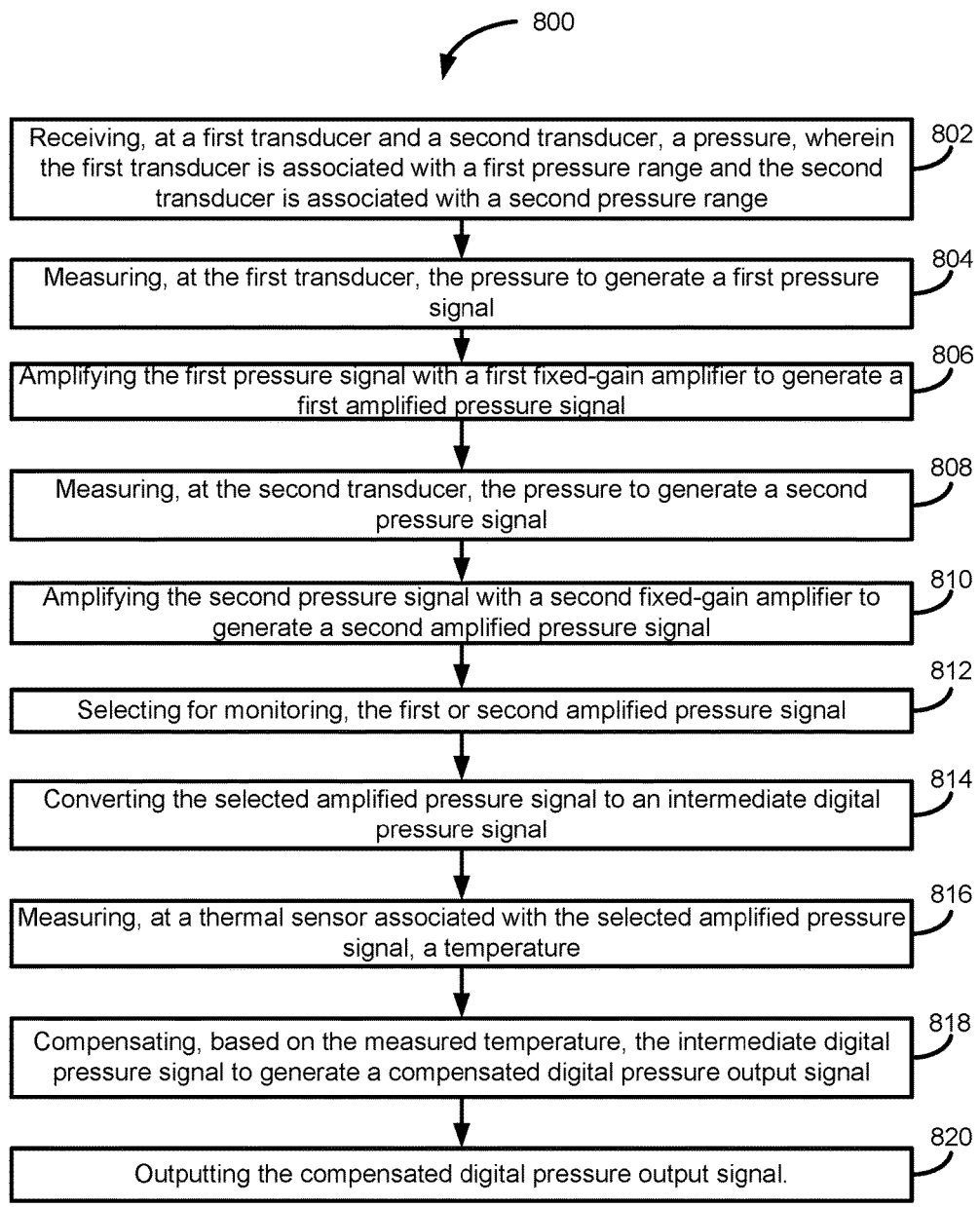

FIG. 8 is a flow diagram 800 of a method, according to an example implementation of the disclosed technology.

DETAILED DESCRIPTION

Certain example implementations of the disclosed technology utilize a sensor having multiple sensing transducers with appropriate switching and conditioning to provide a continuous output proportional to the applied pressure over a large pressure range with significantly enhanced accuracy. Certain disclosed embodiments utilize multiple pressure transducers, each of which is optimized for a specific portion of the pressure range and each of which is selected according to the pressure range being measured.

Certain example implementations may utilize range downscaling, for example, to digitally re-range the sensor output signal according to the applied pressure range. Certain example implementations may utilize multiple transducers, each of which can be individually re-ranged. For instance a 500 PSI transducer and a 50 PSI transducer can be included in the same sensor package. This allows for each sensor to be used over a smaller dynamic range, and may provide an increased bandwidth and a higher signal to noise ratio. Certain example implementations provide individual sensors that are capable of extreme over-pressure conditions, which may allow the lower pressure-range sensors to operate without damage, even when the measured pressure is at or above the maximum range of the higher pressure-range sensors. In certain example implementations, each transducer of the sensor may include a temperature sensor for measuring the transducer temperature. In certain example implementations, each transducer may be equipped with its own fixed gain amplifier. In certain example implementations, temperature correction may be applied to the sensor output signal by utilizing thermal correction coefficients, look-up tables, and/or curves. In certain example implementations, the use of the fixed gain amplifiers may enable thermal correction of a digitally re-ranged signal.

Some implementations of the disclosed technology will be described more fully hereinafter with reference to the accompanying drawings. This disclosed technology may however, be embodied in many different forms and should not be construed as limited to the implementations set forth herein.

Figure 1:
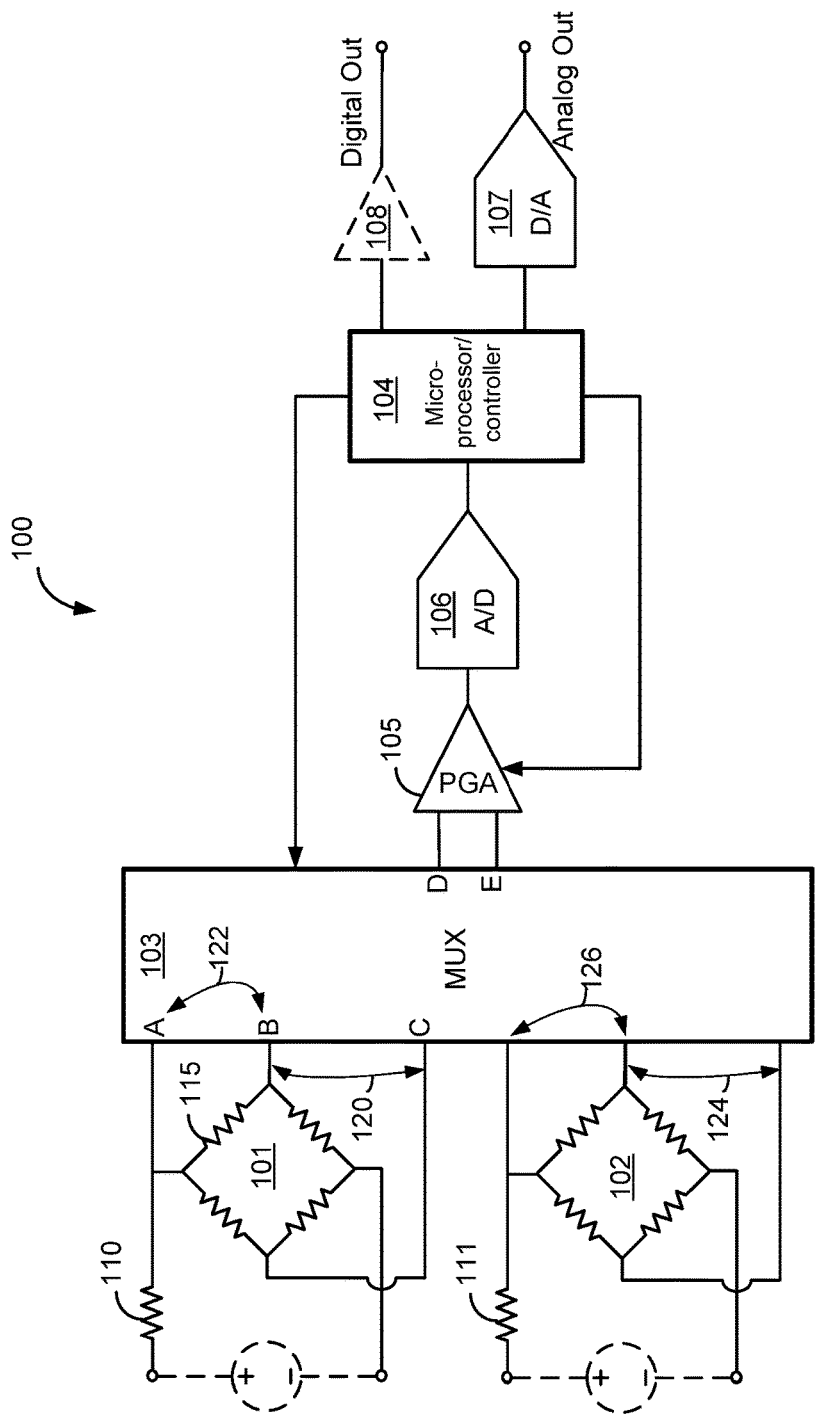
FIG. 1 is a circuit block diagram of a multiple-range sensor assembly 100 including a multiplexer 103 for transducer selection and a programmable amplifier 105 for amplifying the selected signal, according to an example implementation of the disclosed technology.

FIG. 1 is a block diagram of an example multiple range sensor assembly 100, which includes a plurality of transducers including a first transducer 101 and at least a second transducer 102. According to an example implementation of the disclosed technology, the transducers 101 102 may be configured to measure a pressure. In certain example implementations of the disclosed technology, the transducers 101 102 may further be in communication with respective temperature sensors 110 111. The sensor assembly 100 may further include a multiplexer 103 in communication with a microprocessor 104. The microprocessor 104 may be configured to communicate with the multiplexer 103, for example, to selectively couple (to the multiplexer 103 output) one of (1) a pressure signal 120 from the first transducer 101, (2) a pressure signal 124 from the second transducer 102, (3) a temperature signal 122 associated with the first transducer 101, or (4) a temperature signal 126 associated with the second transducer 102. In an example implementation, a programmable gain amplifier (PGA) 105 may be utilized to amplify and/or condition the selected signal. In certain example implementations of the disclosed technology, the microprocessor 104 may provide instructions to the PGA, for example, to selectively set the gain and/or offset to a particular value as appropriate for the desired range and transducer or temperature measurement combination.

In accordance with an example implementation of the disclosed technology, the amplified analog signal from the PGA 105 may be converted to a digital signal by an analog-to-digital converter (A/D) 106 before being input to the microprocessor 104. In some implementations, the A/D 106 may be part of the microprocessor 104. In certain example implementations of the disclosed technology, one or both of the PGA 105 and the A/D 106 may be implemented in the microprocessor 104. In an example implementation, the specifications of the A/D 106 can be selected based on the needed bandwidth, signal to noise ratio, resolution, and other factors.

In an example implementation, the microprocessor 104 may output a digital signal representation of the pressure measurement signal corresponding to the selected transducer 101 102, and this signal can be reconverted to an analog signal for output by a digital-to-analog converter (D/A) 107. In certain example implementations of the disclosed technology, the D/A 107 may provide a voltage or milliamp signal with appropriate signal conditioning. In certain example implementations of the disclosed technology, output from the microprocessor 104 can also be output in a digital format such as Ethernet, RS-485, CAN, etc. In certain example implementations of the disclosed technology, an optional buffer 108 can be utilized to buffer a digital signal for output.

In accordance with an example implementation of the disclosed technology, the temperature sensors 110 111, as discussed above, may be thermistors or resistors (such as high TC resistors) having known temperature-related resistance characteristics. In an example implementation, the temperature sensors 110 111 may form part of a voltage divider circuit so that a temperature of the corresponding transducer can be determined by reading a voltage 122 across the divider circuit. For example, the first temperature sensor 110 may form a voltage divider with a bridge resistor 115 associated with the first transducer 101. In certain example implementations of the disclosed technology the bridge resistor 115 may be designed to have a low temperature coefficient (low TC) while the temperature sensor 110 may have a high TC. In this way, temperature may predominately affect only one of the resistors in the voltage divider. Certain example implementations of the disclosed technology may utilize additional components in the temperature sensor circuit, and other switching configurations by the multiplexor 103 may be utilized without departing from the scope of the claimed technology.

In accordance with an example implementation of the disclosed technology, the multiplexer 103 may be switched (for example, by the microprocessor 104) to connect input "A" to output "D" and input "B" to output "E" on the multiplexer 103. In accordance with an example implementation of the disclosed technology, the microprocessor 104 may utilize the temperature information to compensate the output signal for thermal effects, as will be further explained with respect to FIGS. 3-7 below.

As discussed with respect to FIG. 1, certain components in the signal chain (i.e., the PGA 105, A/D 106, microprocessor 104, etc.) can be used for both pressure and temperature measurements by utilization of the multiplexer 103 to select the desired signal path(s). For example, in a first time period, the first temperature signal 122 may be selected via the multiplexer 103 and the PGA 105 and A/D 106 can further process the selected signals. Then in a second time period, the first pressure signal 120 may be selected via the multiplexer 103, and the same PGA 105 and A/D 106 can be utilized to process this signal without requiring additional components. However, this approach may limit the speed of the data acquisition when the multiplexer 103 switches between the respective ports to make the pressure and temperature measurements. Therefore, this approach, as discussed with respect to FIG. 1, may be best applied for relatively low bandwidth applications.

In certain example implementations of the disclosed technology, the microprocessor 104 may receive user input for appropriated ranging. For example, a user may input an indication to the microprocessor 104 to select the full scale range to be either a first value (such as 10 PSI for example, via selection of the first transducer 101) or a second value (such as 500 PSI for example, via selection of the second transducer 102). In this example implementation, the microprocessor may adjust the signal chain appropriately by selecting the appropriate transducer 101 102. It should be noted that for this and all other embodiments disclosed herein that some of the individual components, as depicted in FIG. 1 may be part of a single system-on-a-chip (SOC) or Field Programmable Gate Array (FPGA), rather than as separate integrated circuits and components.

Figure 2:
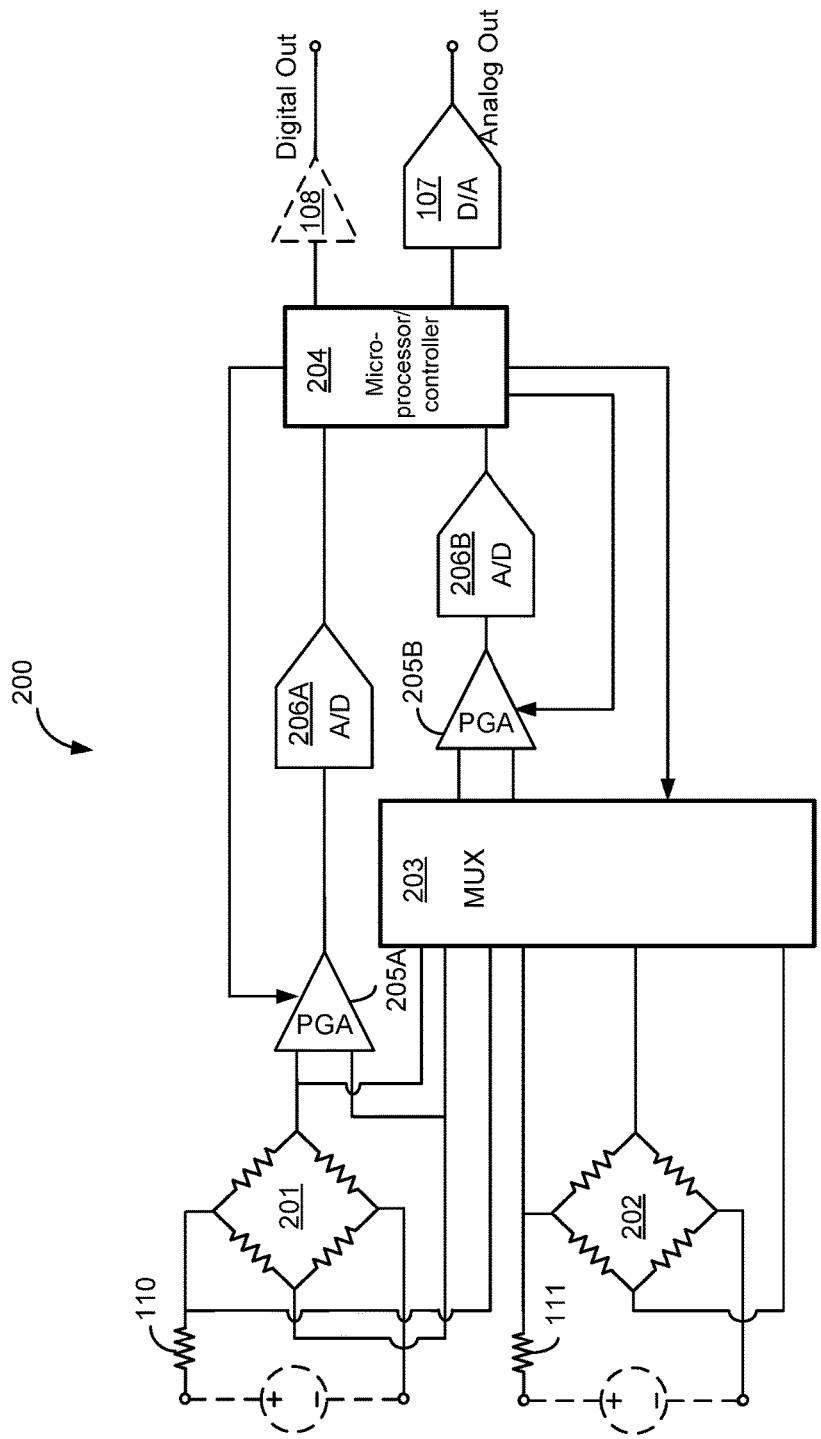
FIG. 2 is a circuit block diagram of a multiple-range sensor assembly 200 for automatic re-ranging, according to an example implementation of the disclosed technology.

FIG. 2 is a block diagram of a multiple range sensor assembly 200 for automatic re-ranging, according to an example implementation of the disclosed technology. This embodiment is similar to the embodiment shown in FIG. 1, except for the highest range sensor 201 has a dedicated signal chain with its own dedicated PGA 205A and dedicated A/D 206A. This allows for the microprocessor 204 to make two pressure measurements simultaneously. For example, the first measurement can be a high accuracy measurement of the user selected range (for example, using a selected transducer 202), while the second measurement may be made by the highest range sensor (using transducer 201, for example). In an example implementation, this second measurement does not need to be extremely accurate, as it can be used as a secondary measurement to determine the pressure when the first measurement pressure is out of range of the selected transducer 202.

To highlight differences between the second embodiment as shown in FIG. 2 and the first embodiment as shown in FIG. 1, if the sensor in the first embodiment is set for 0-10 PSI and the pressure goes to 15 PSI, there may be no way for the user to know that the actual pressure has gone out of range, so the pressure measurement may be inaccurate. However, as shown in FIG. 2, the highest-range transducer 201 may be used to monitor the pressure so that an appropriately ranged transducer may be manually or automatically selected for the measurement via the multiplexer 203, then appropriately conditioned via the common PGA 205B, and the common A/D 206B.

In certain applications, the output from the sensor assembly 200 can be analog or semi-analog to support legacy systems (such as HART where the user may not necessarily realize the sensor is out of range or be able to re-range the sensor). In an example implementation, the multiplexer 203 may select the appropriate transducer 202 to keep the main measurement chain at the lower range (for example, 0-10 PSI range) while using the higher range sensor 201 to measure with reasonable accuracy the actual value of the pressure. In this implementation, an alert may be sent to the user when the reading is out of range of the selected transducer 202. This way the user can re-range the system to the appropriate range without losing any data.

Figure 3:
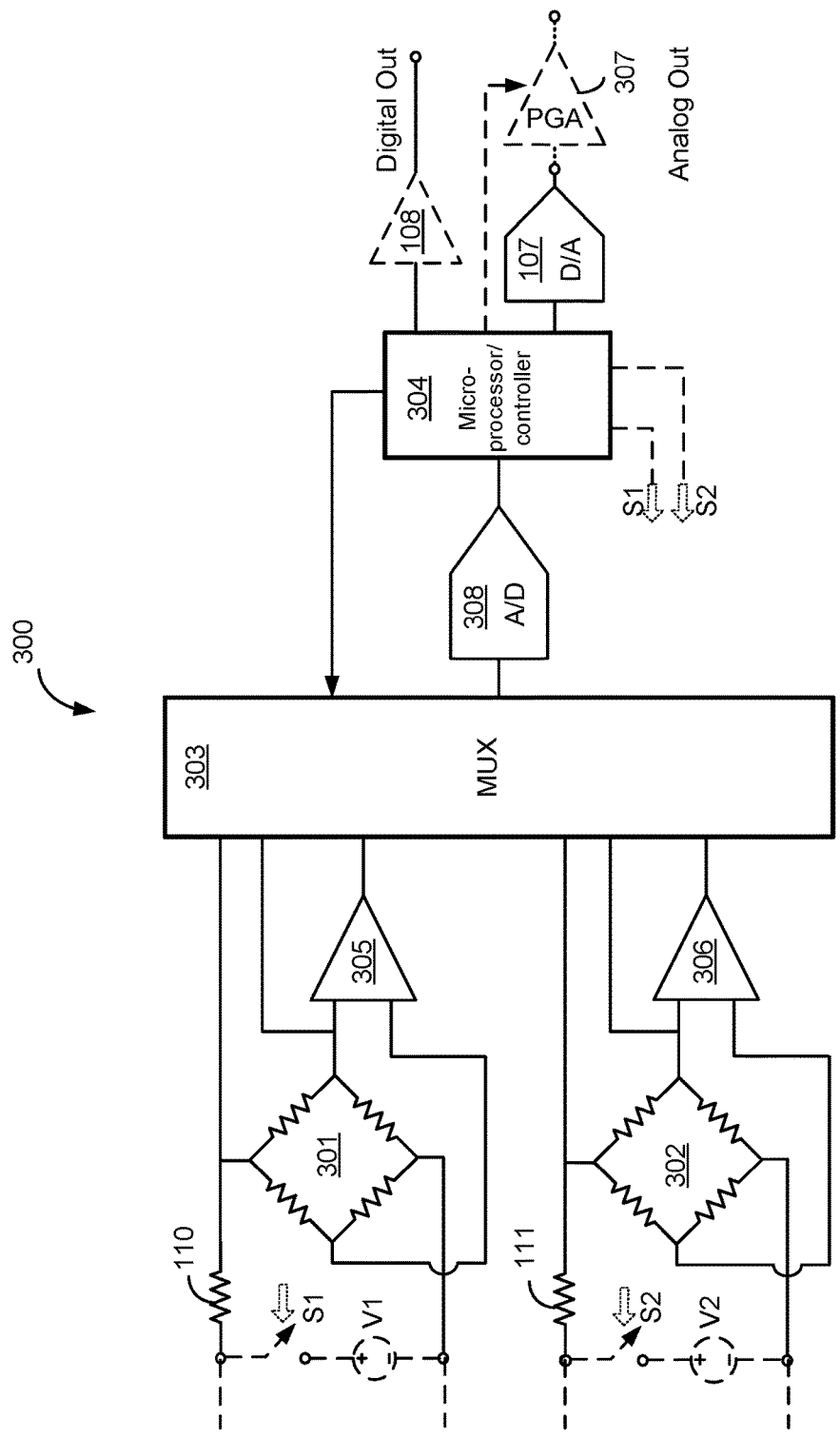
FIG. 3 is a circuit block diagram of a multiple-range sensor assembly 300 including a fixed amplifier for each transducer, according to an example implementation of the disclosed technology.

FIG. 3 is a block diagram of a multiple range sensor assembly 300 including a fixed amplifier 305 306 for each transducer 301 302, a multiplexer 303 for transducer selection, and a microprocessor 304 for transducer selection and compensation, according to an example implementation of the disclosed technology. Thermal sensors 110 111 may also be utilized in this implementation to compensate for temperature-related errors, as discussed with reference to FIG. 1, and as will be further discussed below.

In the implementation shown in FIG. 3, the fixed gain amplifiers 305 306 may be used to acquire the raw data from the respective transducers 301 302. For example, when a user selects a different pressure range, the microprocessor may select (via the multiplexer 303) the transducer that is appropriate for the selected range. For instance, if the first transducer 301 has a 100 PSI range and the second transducer 302 has a 500 PSI range, and the user chooses a range of 50 PSI, the microprocessor 304 may select the 100 PSI transducer 301 via the multiplexer 303.

In certain example implementations, each of the transducers 301 302 may be energized when the sensor assembly 300 is powered-up and the multiplexer 303 may be utilized to select the appropriate (amplified) transducer signal. In such example implementations, energizing/bias voltage(s) may applied to each of the transducers 301 302 and the respective signals from each of the respective transducers 301 302 and amplifiers 305 306 may be continuously available for selective monitoring based on user selection or appropriate input pressure ranges matched to the capability of the given transducer 301 302.

In certain example implementations, and as depicted by the dashed lines in FIG. 3 (indicating alternative embodiments), the transducers 301 302 may be selectively energized. For example, switches S1 S2 may be controlled by the microprocessor 304 to selectively energize the transducers 301 302 with respective energizing voltages V1 V2. In certain example implementations, the energizing voltages V1 V2 may be the same voltage. In other example implementations, the energizing voltage V1 V2 may be different and configured for the particular respective transducer 301 302.

In accordance with an example implementation of the disclosed technology, the pressure signal measured by the 100 PSI transducer 301 may be amplified via a first amplifier 305 with a fixed gain; however the signal may be digitally processes such that a full scale of 50 PSI is used. For example, the microprocessor 304 may use the same thermal correction coefficients for the transducer 301 that it would use if the full scale range was 100 because the transducer 301 and analog signal chain is unchanged. According to an example implementation of the disclosed technology, the microprocessor 304 may range the analog output so that 50 PSI is the full scale output. Accordingly, the use of a multi-transducer, multi-range sensor system 300 may provide enhanced flexibility and may allow a user to stock fewer sensor types and to use the same sensor type in many different installations.

Figure 4:
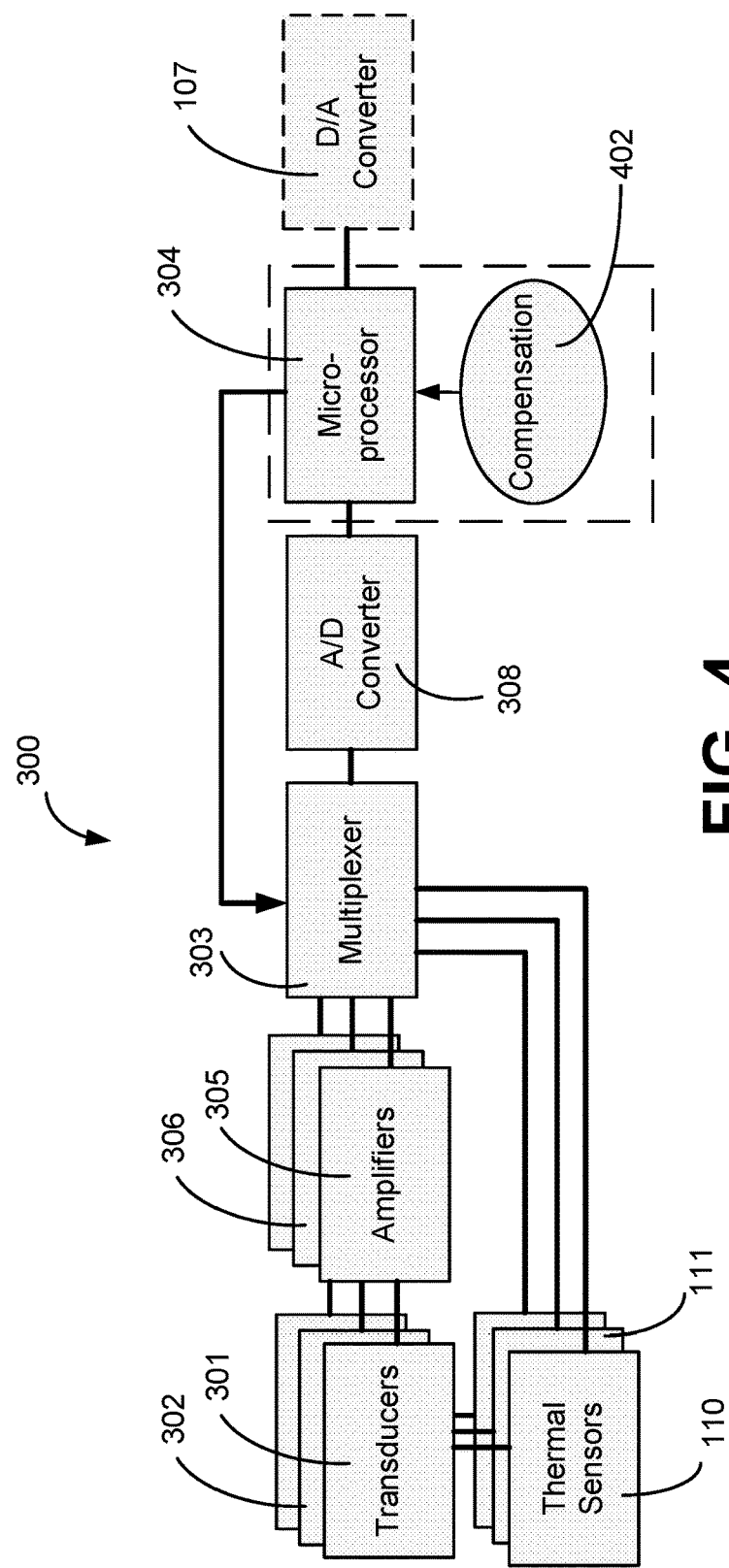
FIG. 4 is a simplified block diagram of a multiple-range sensor assembly 300 as shown in FIG. 3, according to an example implementation of the disclosed technology.

FIG. 4 is a simplified block diagram of a multiple-range sensor assembly 300, as shown in FIG. 3, according to an example implementation of the disclosed technology. The various component representations 107 110 111 301 302 303 304 305 306 308 are shown in FIG. 4, with descriptions for these corresponding components discussed above with respect to FIG. 3. FIG. 4 also depicts a compensation module 402 in communication with the microprocessor 304. As will be discussed below with reference to FIGS. 6-7, the compensation module 402 may include a thermal compensation module configured to compensate the (digital and/or analog) output for temperature affects based on a reading of the thermal sensors 110 111. In certain example implementations, the compensation module 402 may further compensate the output for non-linear response of the transducers 301 302, and will be discussed below with referenced to FIG. 6. In accordance with an example implementation of the disclosed technology, the compensation module 402 may be embodied in firmware or software, and processed by the microprocessor 304. In certain example implementations, the compensation module 402 may include memory for storing compensation curves, coefficients, and/or a compensation look-up-table.

Figure 5:
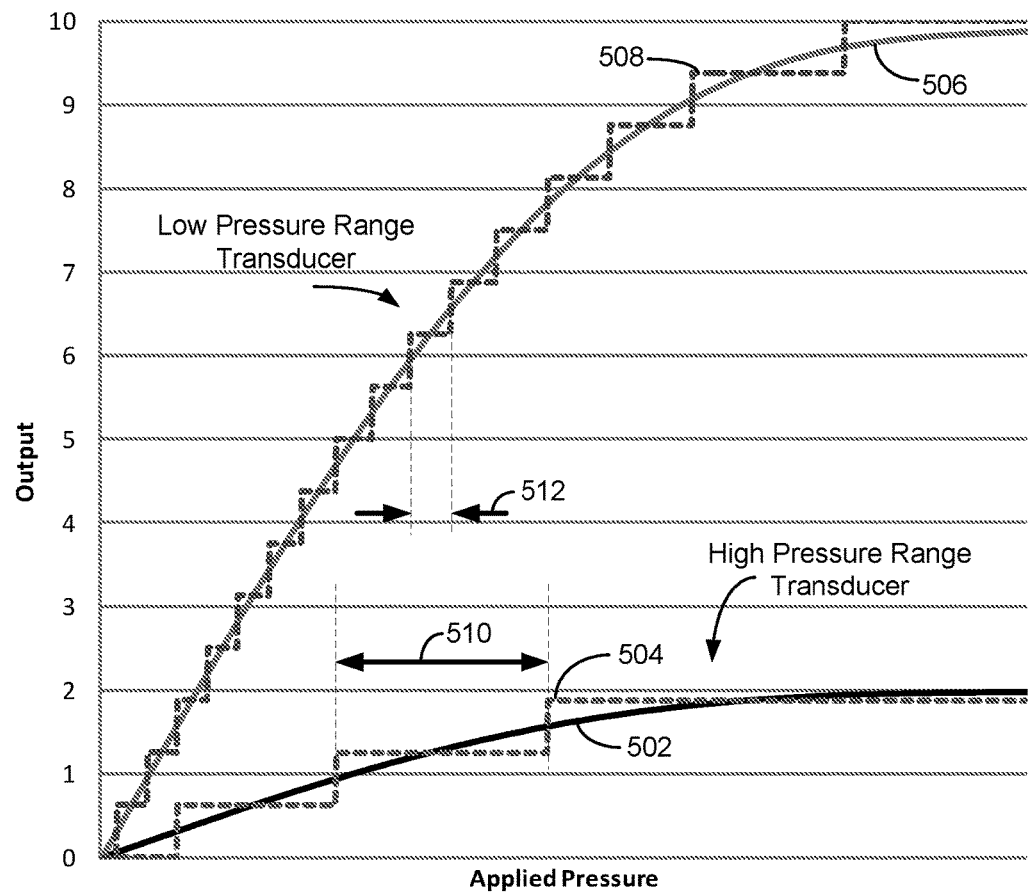
FIG. 5 illustrates an example of how an applied pressure (x-axis) may be measured, digitized, and output (y-axis) for both a low-pressure-range first transducer (upper curves)

FIG. 5 provides illustrative examples of how an applied pressure (x-axis) may be measured, digitized, and output (y-axis) for both a low-pressure-range first transducer (upper curves) and a relatively higher-pressure-range second transducer (lower curves). For example, and to further illustrate the example provided above with respect to FIGS. 3-4, the first transducer (such as transducer 301 in FIGS. 3-4) may have a 100 PSI full-scale range while the second transducer (such as transducer 302 in FIGS. 3-4) may have a 500 PSI full scale range. In this example illustration, amplified analog pressure signals (for example, from the output of the respective fixed amplifiers 305 306 in FIGS. 3-4) are illustrated by the respective solid curves 506 502, while the corresponding digitized signals (such as may be provided at the output of the A/D converter 308 after selection of the transducer by the multiplexer 303, as shown in FIGS. 3-4) are illustrated by the respective dashed curves 508 504.

Also depicted in FIG. 5 (for illustration purposes only) is exaggerated non-linear transducer responses as a function of the applied pressure (x-axis). However, certain example transducer implementations may result in different response curves without departing from the scope of the disclosed technology. Furthermore, to illustrate the example interrelations among the applied pressure range, the selected transducer, and the resulting digitized signal (for example, as discussed above with reference to the A/D 308 in FIGS. 3-4), the digitized output signals 508 504 are illustrated as if they were generated using a low-resolution, 4-bit (16 levels), 10-volt full-scale A/D converter. However, in practice, a higher-resolution A/D converter, such as a 12-bit (or higher) A/D converter may be utilized.

The resolution of an A/D converter is a function of how many parts the maximum signal can be divided into. The formula to calculate resolution is $2^n$. For example, a 12-bit A/D has a resolution of $2^{12}=4,096$, with the best resolution being 1 part out of 4,096, or 0.0244% of the full scale. Resolution of the A/D can limit the precision of a measurement. The higher the resolution (number of bits), the more precise the measurement. Returning to the example of FIG. 5, the example 4-bit A/D divides the vertical range of the signal from the transducers into 16 discrete levels with respect to the full-scale vertical range. With a vertical range of 10 V, the 4-bit A/D cannot ideally resolve voltage differences smaller than 625 mV, as shown by the discreet levels in the digitized output signals 508 504. In comparison, a 14-bit A/D converter with 16,384 discrete levels can ideally resolve voltage differences as small as 610 μV.

The curves shown in FIG. 5 illustrate how a properly ranged and properly selected transducer can help reduce uncertainty in a measurement. For example, assume that an applied pressure has a range of about 0 to about 100 PSI. If a 500 PSI transducer is used to measure this applied pressure (as shown in the bottom curve 502), the resulting digitized output 504 (using the exaggerated digitizing example utilizing a 4-bit A/D) in the mid portion of the applied pressure range may have a significant uncertainty 510 of about 25 PSI, with even worse uncertainty at higher pressure levels due to the example non-linear response of the transducer. In contrast, if a (better matched) 100 PSI transducer is selected, the resulting mid-range uncertainty 512 may be reduced to about 5 PSI since the full range of the A/D is being utilized.

According to an example implementation of the disclosed technology, a multiplexer (such as multiplexer 303 in FIGS. 3-4) may be switched to select a given transducer's amplified output such that the selected transducer is appropriately matched with the range of the applied pressure. In certain example implementations, if the applied pressure range is greater than the measurable range of the selected transducer, the next higher range pressure transducer in the multi-transducer sensor may be selected. In certain example implementations, a microprocessor may switch the multiplexer to sequentially monitor the plurality of transducers, and the appropriately-ranged transducer may then be automatically selected for primary monitoring based on the relative levels of the monitored transducers. In certain example implementations, the user may manually select the transducer for monitoring input applied pressure.

FIG. 6 provides an illustrative example for compensating the output of a selected transducer to reduce or eliminate a non-linear response as a function of the applied pressure. In accordance with an example implementation of the disclosed technology, a microprocessor (such as microprocessor 104 204 or 304 as shown in the previous figures) may be utilized to perform the compensation. In this example illustration, the measured response 602 may be in the form of a digitized pressure signal (for example, from the output of the A/D converter 308 in FIGS. 3-4) and it may be received by the microprocessor (for example, the microprocessor 304 in FIGS. 3-4). According to an example implementation of the disclosed technology, a known compensation 604 may be applied to the measured response 602 to result in a compensated output signal 606, which in certain example implementations may a linearized digital output signal. As may be appreciated in this example, the A/D converter (such as the A/D 308 as shown in FIGS. 3-4) may have a much higher resolution (for example, 14-bit) than shown in the example presented above with respect to FIG. 5 in which the example A/D resolution was set to 4-bits for illustration purposes only. Thus, the quantization effects of the A/D may still be present in the measured response 602, but such quantization may be reduced with a high-resolution A/D to the point where the non-linear compensation may provide additional measurement accuracy. In certain example implementations, compensation for non-linear response of the transducer may be handled by an external processor or module. In yet other example implementations, temperature and/or non-linear compensation can be performed, as will be discussed below with reference to FIG. 7.

FIG. 7 illustrates compensating the output of a selected transducer for both temperature and non-linearity. However, in certain example implementations, the temperature alone may be compensated. As discussed above with respect to FIG. 6, and in accordance with an example implementation of the disclosed technology, a microprocessor (such as microprocessor 104 204 or 304 as shown in the previous figures) may be utilized to perform the compensation. In this example illustration, a measured response 602 (for example, from the output of the A/D converter 308 in FIGS. 3-4) may be received by the microprocessor (for example, the microprocessor 304 in FIG. 3-4) and known temperature compensation values 702 may be applied to the measured response 602 based on the measured temperature (T1, T2, T3, etc.), resulting in corresponding temperature-compensated output 704. For example, a specific compensation value may be selected based on the value of the measured response 602 and the measured temperature, and this compensation value may be added to (or subtracted from) the measured response 602 based on the monitored temperature to produce a corresponding compensated output signal 702. In certain example implementations, the temperature sensors 110 111, as discussed above with respect to FIGS. 1-4 may be utilized for monitoring the temperature of the respective transducer, and may be utilized for selection of the temperature compensation values.

As may be appreciated by those having skill in the art, the embodiment as shown in at least FIG. 3 and discussed with reference to FIGS. 4-7 allows for a simplified and reliable compensation process of the selected transducer 301 302 by virtue of the fixed-gain amplifiers 305 306. In other words, since the amplifiers 305 306 have fixed gain, the signal chain from the transducers 301 302 through the amplifiers 305 306 and through the multiplexer 303 and A/D 308 remain consistent, and therefore, the microprocessor 304 can utilize consistent compensation curves without having to account for the extra complexity of changing gains in the signal path, such as may be the case in the embodiments shown in FIG. 1 and FIG. 2, which use programmable gain amplifiers.

FIG. 8 is a method flow diagram 800 according to an example implementation of the disclosed technology. In block 802, the method includes receiving, at a first transducer and a second transducer, a pressure, wherein the first transducer is associated with a first pressure range and the second transducer is associated with a second pressure range. In block 804, the method includes measuring, at the first transducer, the pressure to generate a first pressure signal. In block 806, the method includes amplifying the first pressure signal with a first fixed-gain amplifier to generate a first amplified pressure signal. In block 808, the method includes measuring, at the second transducer, the pressure to generate a second pressure signal. In block 810, the method includes amplifying the second pressure signal with a second fixed-gain amplifier to generate a second amplified pressure signal. In block 812, the method includes selecting for monitoring, the first or second amplified pressure signal. In block 814, the method includes converting the selected amplified pressure signal to an intermediate digital pressure signal. In block 816, the method includes measuring, at a thermal sensor associated with the selected amplified pressure signal, a temperature. In block 818, the method includes compensating, based on the measured temperature, the intermediate digital pressure signal to generate a compensated digital pressure output signal. In block 820, the method includes outputting the compensated digital pressure output signal.

In accordance with an example implementation, the disclosed technology can include converting the compensated digital pressure output signal to an analog output signal and outputting the analog output signal.

In an example implementation, the selecting for monitoring can include determining, based on the intermediate digital pressure signal, whether the received pressure corresponds to the first pressure range or the second pressure range. Responsive to determining that the received pressure corresponds to the first pressure range, certain example implementations can include selecting the first amplified pressure signal as the selected amplified pressure signal; and responsive to determining that the received pressure corresponds to the second pressure range, selecting the second amplified pressure signal as the selected amplified pressure signal.

In certain example implementations, the selecting may be performed, at least in part, by sequentially reading the first and second intermediate digital signals.

In an example implementation, the selecting may be based on a comparison of one or more of the first and second intermediate digital signals with one or more of the first and second pressure ranges associated with the corresponding first and second transducers.

In certain example implementations, the selecting may be performed responsive to a selection indication provided by a user.

According to an example implementation, the disclosed technology can further include compensating the intermediate digital pressure signal based on a predetermined nonlinearity of the associated first or second transducer to generate a linearized compensated digital pressure output signal.

In an example implementation, the first pressure range may be a sub-range of the second pressure range.

In an example implementation, the second pressure range may be different from the first pressure range.

Certain example implementations can include outputting an overpressure indication when one or more of the intermediate digital pressure signal and the compensated digital pressure output signal exceed corresponding predetermined values.

In certain example implementations, each of the first pressure transducer and the second pressure transducer may include a diaphragm that is part of a piezoresistive array.

In certain example implementations of the disclosed technology, one or more of the transducers may be utilized to measure a pressure signal, for example, without requiring that each transducer of the multiple-transducer sensor continues to generate a pressure signal or amplified pressure signal when not selected. For example, one implementation can include receiving, at a first transducer and a second transducer, a pressure, wherein the first transducer is associated with a first pressure range and the second transducer is associated with a second pressure range; measuring, at one or more of the first transducer and the second transducer, the pressure to generate one or more of a first pressure signal and a second pressure signal; amplifying the one or more of the first pressure signal and the second pressure signal with one or more of a first fixed-gain amplifier and a second fixed gain amplifier to generate one or more of a first amplified pressure signal and a second amplified pressure signal; selecting for monitoring, the first or second amplified pressure signal; converting the selected amplified pressure signal to an intermediate digital pressure signal; measuring, at a thermal sensor associated with the selected amplified pressure signal, a temperature; compensating, based on the measured temperature, the intermediate digital pressure signal to generate a compensated digital pressure output signal; and outputting the compensated digital pressure output signal.

It should be clear from the disclosed technology that a multiple range transducer may be implemented by utilizing multiple transducers, appropriate amplifiers, multiplexing circuitry, A/D (and D/A) converters and at least one microprocessor. In accordance with an example implementation of the disclosed technology, each of the multiple transducers can be designed to accurately accommodate a given pressure range and can be employed to produce an output when the applied pressure is within that range. In this manner, the most accurate and efficient sensor may be used for each of the plurality of pressure ranges to be measured, therefore, providing a high degree of accuracy across a relatively large pressure range.

In accordance with an example implementation of the disclosed technology, the use of fixed-gain amplifiers with each corresponding transducer may provide the additional technical benefit of enabling a simplified compensation scheme to correct for temperature and/or transducer non-linearity. It should be apparent to one skilled in the art that there are many alternate ways of accomplishing the disclosed technology, all of which are deemed to be encompassed within the spirit and claims appended hereto.

What is claimed is:

1. A method, comprising:
   receiving, at a first transducer and a second transducer, a pressure, wherein the first transducer is associated with a first pressure range and the second transducer is associated with a second pressure range;
   measuring, at the first transducer, the pressure to generate a first pressure signal;
   amplifying the first pressure signal with a first fixed-gain amplifier to generate a first amplified pressure signal;
   measuring, at the second transducer, the pressure to generate a second pressure signal;
   amplifying the second pressure signal with a second fixed-gain amplifier to generate a second amplified pressure signal;
   selecting for monitoring, the first or second amplified pressure signal;
   converting the selected amplified pressure signal to an intermediate digital pressure signal;
   measuring, at a thermal sensor associated with the selected amplified pressure signal, a temperature;
   compensating, based on the measured temperature, the intermediate digital pressure signal to generate a compensated digital pressure output signal; and
   outputting the compensated digital pressure output signal.

2. The method of claim 1, further comprising:
   converting the compensated digital pressure output signal to an analog output signal; and
   outputting the analog output signal.

3. The method of claim 1, wherein the selecting for monitoring comprises:
   determining, based on the intermediate digital pressure signal, whether the received pressure corresponds to the first pressure range or the second pressure range; and
   responsive to determining that the received pressure corresponds to the first pressure range, selecting the first amplified pressure signal as the selected amplified pressure signal; and
   responsive to determining that the received pressure corresponds to the second pressure range, selecting the second amplified pressure signal as the selected amplified pressure signal.

4. The method of claim 1, wherein the selecting is performed, at least in part, by sequentially reading the first and second intermediate digital signals.

5. The method of claim 1, wherein the selecting is based on a comparison of one or more of the first and second intermediate digital signals with one or more of the first and second pressure ranges associated with the corresponding first and second transducers.

6. The method of claim 1, wherein the selecting is performed responsive to a selection indication provided by a user.

7. The method of claim 1, further comprising compensating the intermediate digital pressure signal based on a predetermined non-linearity of the associated first or second transducer to generate a linearized compensated digital pressure output signal.

8. The method of claim 1 wherein the first pressure range is a sub-range of the second pressure range.

9. The method of claim 1, wherein the second pressure range is different from the first pressure range.

10. The method of claim 1, further comprising outputting an overpressure indication when one or more of the intermediate digital pressure signal and the compensated digital pressure output signal exceed a predetermined value.

11. A system, comprising:
    a first pressure transducer associated with a first pressure range and configured to receive and measure a pressure to generate a first pressure signal;
    a second pressure transducer associated with a second pressure range and configured to receive and measure the pressure to generate a second pressure signal;
    a first fixed-gain amplifier configured to amplify the first pressure signal to generate a first amplified pressure signal;
    a second fixed-gain amplifier configured to amplify the second pressure signal to generate a second amplified pressure signal;
    a multiplexer in communication with the first and second fixed-gain amplifiers, wherein the multiplexer is configured to receive a selection signal to select, for monitoring, the first or second amplified pressure signal;
    an analog-to-digital converter configured to convert the selected amplified pressure signal to an intermediate digital pressure signal;
    at least one thermal sensor configured to measure and output a temperature signal associated with one or more of the first pressure transducer and the second pressure transducer; and
    a microprocessor configured to:
       receive the intermediate digital pressure signal;
       receive the temperture signal;
       compensate, based on the received temperature signal, the intermediate digital pressure signal to generate a compensated digital pressure output signal; and
       output the compensated digital pressure output signal.

12. The system of claim 11, further comprising a digital-to-analog converter configured to convert an output of the microprocessor to an analog signal.

13. The system of claim 11, wherein the microprocessor is further configured to:
    determine, based on the intermediate digital pressure signal, whether the received pressure corresponds to the first pressure range or the second pressure range;
    output to the multiplexer, the selection signal to select, for monitoring, the first amplified pressure signal responsive to determining that the received pressure corresponds to the first pressure range; and output to the multiplexer, the selection signal to select, for monitoring, the second amplified pressure signal responsive to determining that the received pressure corresponds to the second pressure range.

14. The system of claim 11, wherein the microprocessor is further configured to output to the multiplexer, the selection signal to sequentially select the first and second amplified pressure signal and to sequentially read the corresponding selected first and second intermediate digital signals.

15. The system of claim 14, wherein the microprocessor is further configured to output to the multiplexer, the selection signal based on a comparison of one or more of the first and second intermediate digital signals with one or more of the first and second pressure ranges associated with the corresponding first and second transducers.

16. The system of claim 14, wherein the microprocessor is further configured to compensate the intermediate digital pressure signal based on a predetermined non-linearity of the associated first or second transducer to generate a linearized compensated digital pressure output signal.

17. The system of claim 14 wherein the first pressure range is a sub-range of the second pressure range.

18. The system of claim 14, wherein the second pressure range is different from the first pressure range.

19. The system of claim 14, wherein the microprocessor is further configured to output an overpressure indication when one or more of the intermediate digital pressure signal and the compensated digital pressure output signal exceed a predetermined value.

20. The system of claim 14, wherein each of the first pressure transducer and the second pressure transducer comprise a diaphragm that is part of a piezoresistive array.

* * * * *